(12) United States Patent
Hershey et al.

(10) Patent No.: US 8,340,833 B2
(45) Date of Patent: Dec. 25, 2012

(54) CONTROL DISTRIBUTION TRANSFORMER AND METHOD OF MAKING SAME

(75) Inventors: John Erik Hershey, Ballston Lake, NY (US); Michael James Hartman, Clifton Park, NY (US); Robert Dean King, Schenectady, NY (US); Richard Louis Zinser, Niskayuna, NY (US); John Anderson Fergus Ross, Niskayuna, NY (US); Michael Joseph Dell'Anno, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 241 days.

(21) Appl. No.: 12/751,151

(22) Filed: Mar. 31, 2010

(65) Prior Publication Data

US 2011/0241647 A1 Oct. 6, 2011

(51) Int. Cl.
*H01F 38/00* (2006.01)
(52) U.S. Cl. .................................. 700/295; 323/355
(58) Field of Classification Search .................. 700/295, 700/296
See application file for complete search history.

(56) References Cited

U.S. PATENT DOCUMENTS

| | | | |
|---|---|---|---|
| 2,874,310 A | 2/1959 | Young | |
| 4,235,101 A | 11/1980 | Stadelmann | |
| 4,694,192 A | 9/1987 | Payne et al. | |
| 4,712,097 A * | 12/1987 | Hashimoto | 379/40 |
| 4,804,938 A | 2/1989 | Rouse et al. | |
| 6,538,343 B1 | 3/2003 | Stewart | |
| 7,327,134 B1 | 2/2008 | Weng et al. | |
| 7,376,491 B2 | 5/2008 | Walling et al. | |
| 7,599,161 B2 | 10/2009 | Premerlani et al. | |
| 2002/0110310 A1 | 8/2002 | Kline | |
| 2005/0207081 A1 | 9/2005 | Ying | |
| 2006/0284647 A1 * | 12/2006 | Gunn et al. | 324/771 |
| 2007/0299562 A1 * | 12/2007 | Kates | 700/295 |
| 2008/0077336 A1 * | 3/2008 | Fernandes | 702/57 |
| 2008/0172312 A1 * | 7/2008 | Synesiou et al. | 705/34 |
| 2009/0187358 A1 | 7/2009 | Deaver, Sr. | |
| 2009/0261779 A1 | 10/2009 | Zyren | |

FOREIGN PATENT DOCUMENTS

| | | |
|---|---|---|
| WO | 9522190 A1 | 8/1995 |
| WO | 2008148418 A1 | 12/2008 |

* cited by examiner

*Primary Examiner* — Ryan Jarrett

(74) *Attorney, Agent, or Firm* — Ziolkowski Patent Solutions Group, SC; Jean K. Testa

(57) ABSTRACT

A method, system, and apparatus including a distribution transformer having a communications module. The distribution transformer is configured to convert a first high voltage electricity from a high voltage distribution line to a first low voltage electricity and convey the first low voltage electricity along a low voltage line to an electrical device. The communications module is configured to transmit a load reduction request along the low voltage line to the electrical device.

22 Claims, 4 Drawing Sheets

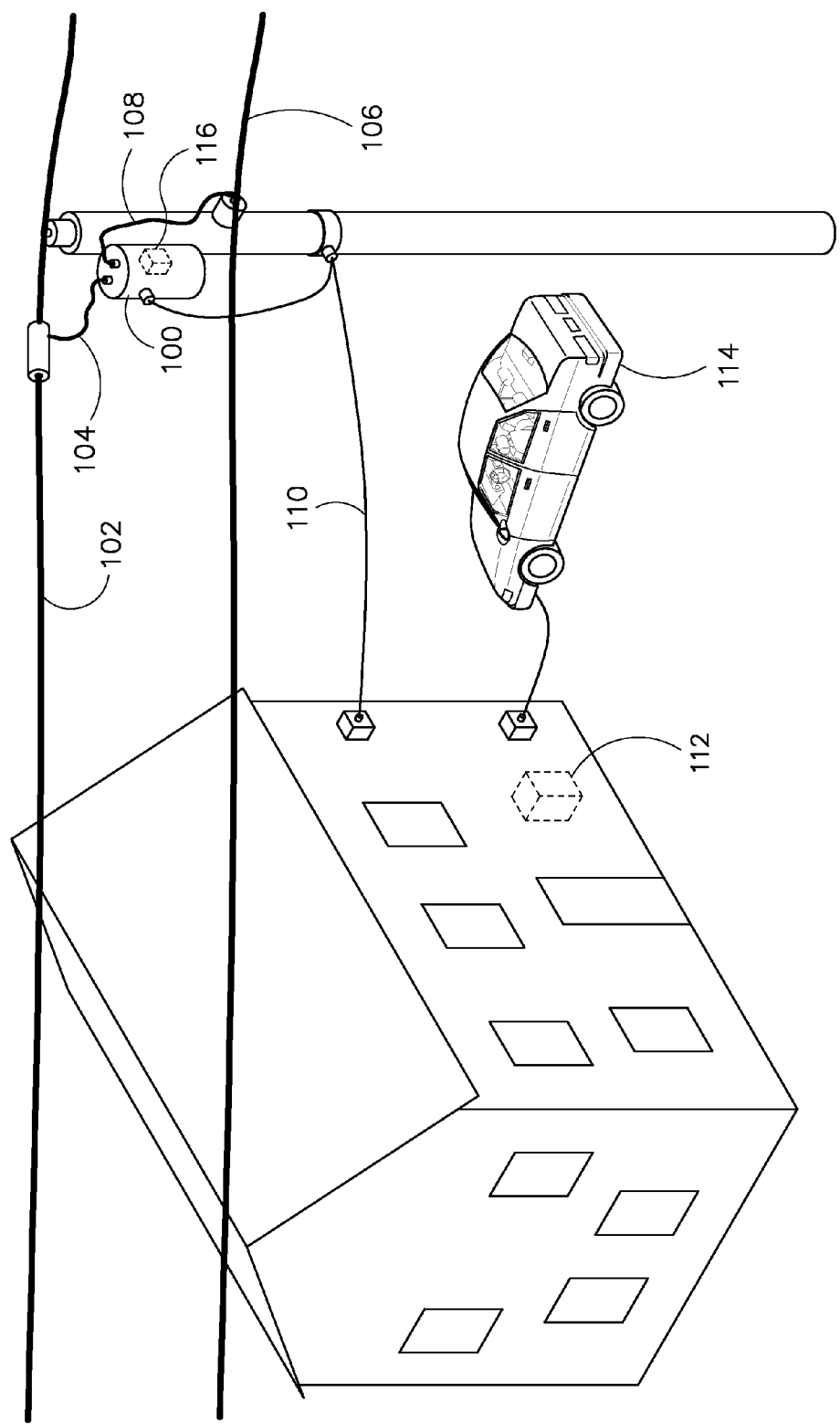

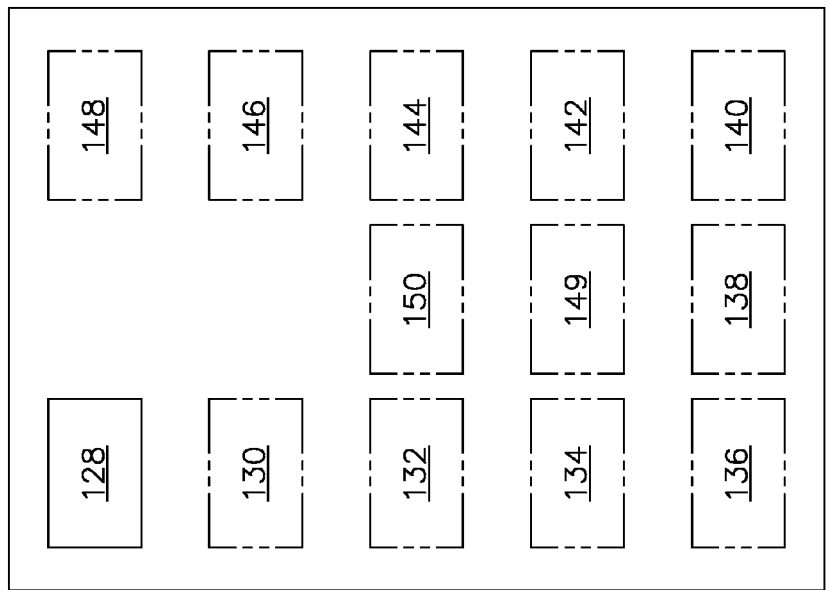
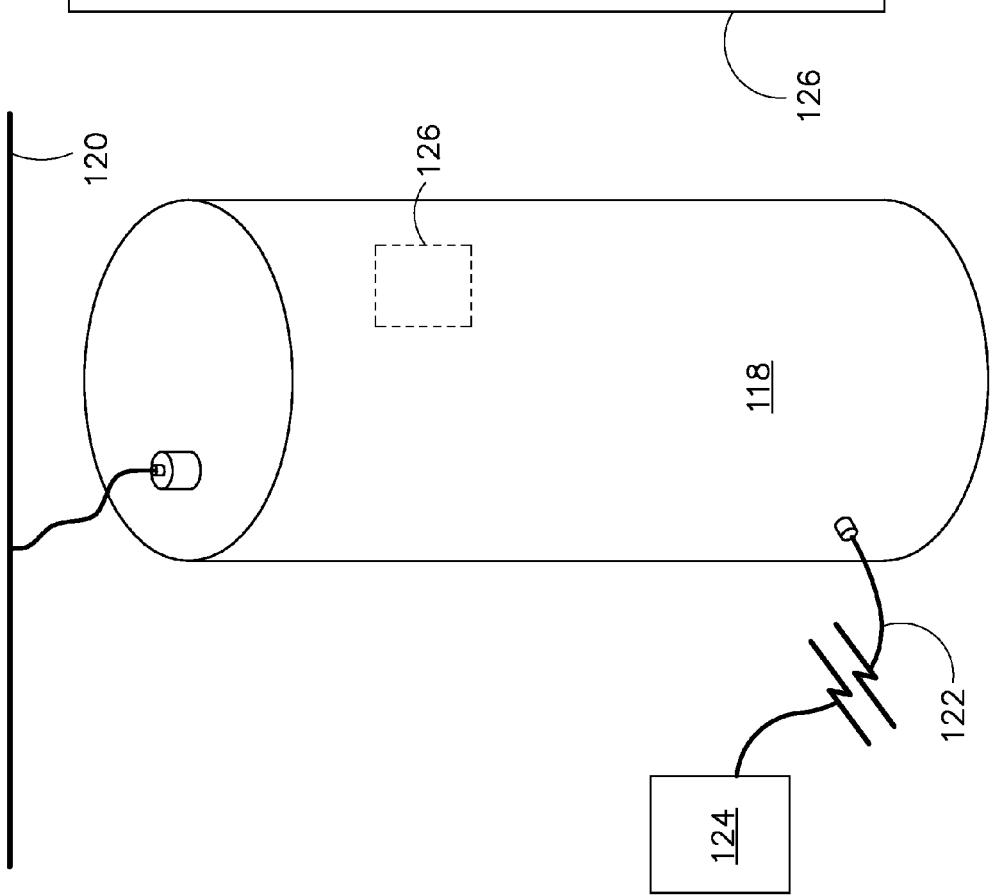

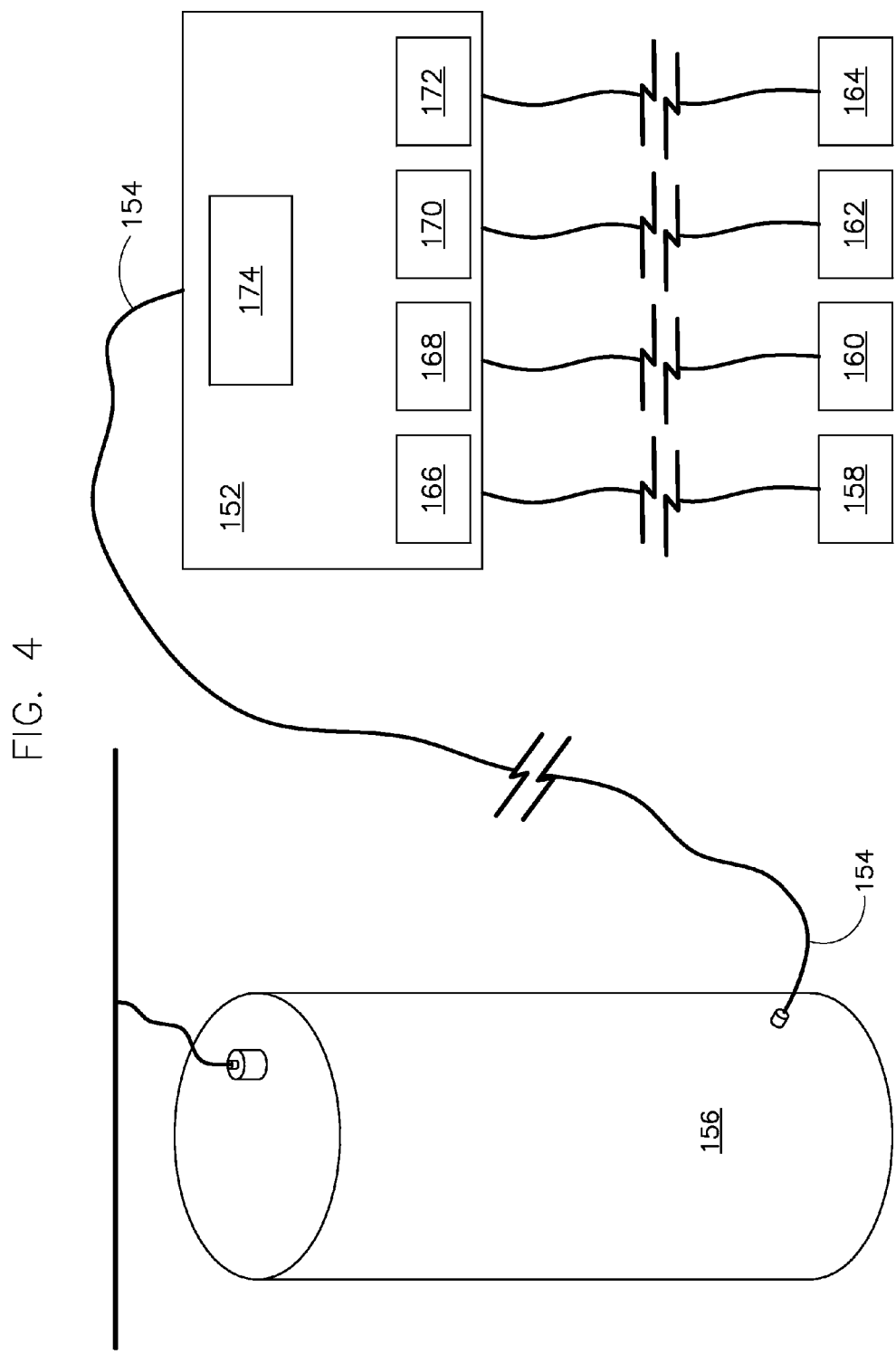

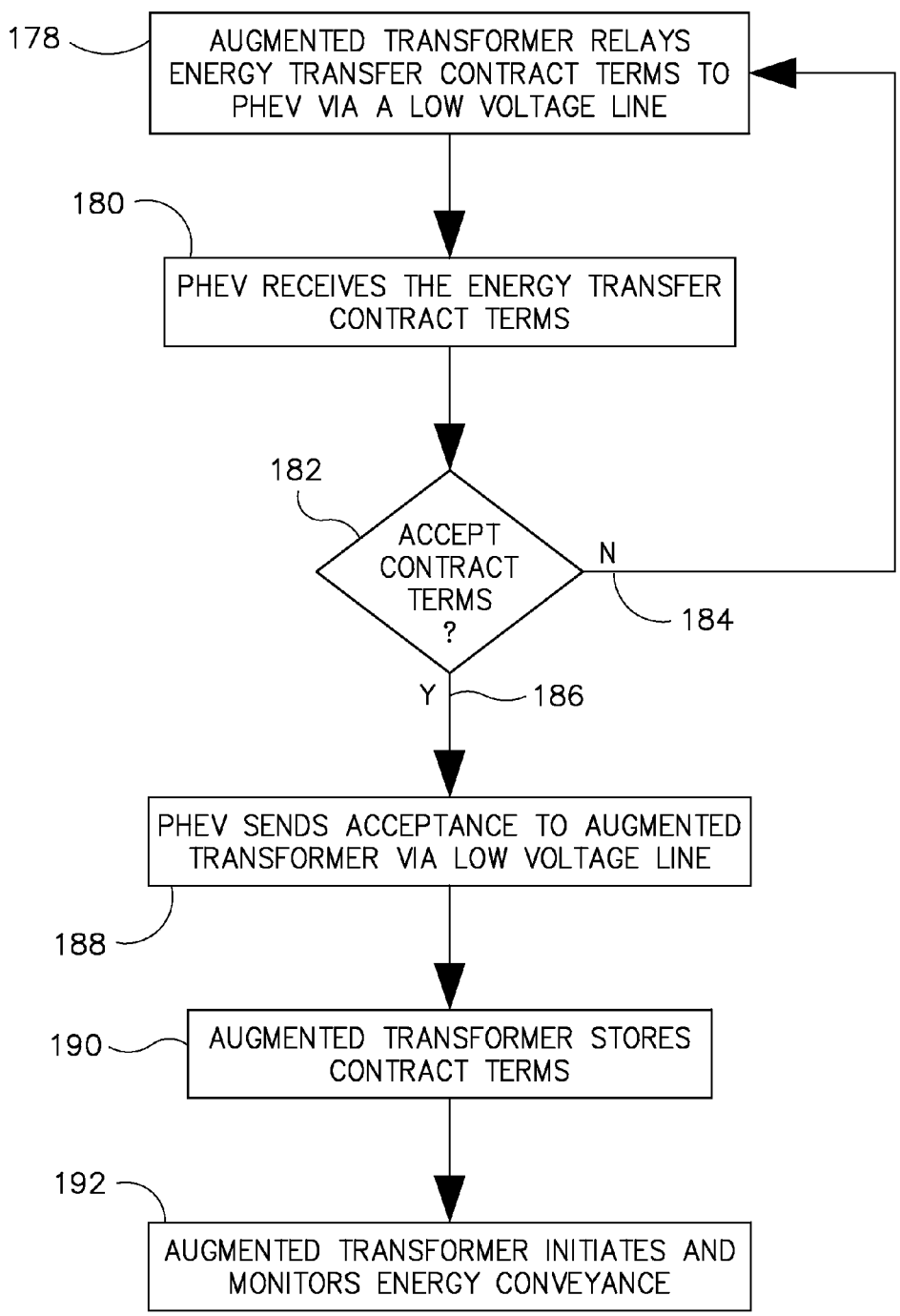

CONTROL DISTRIBUTION TRANSFORMER AND METHOD OF MAKING SAME

BACKGROUND OF THE INVENTION

Embodiments of the invention relate generally to distribution transformers and, more particularly, to a distribution transformer capable of relaying information to one or more electrical devices.

As the human population increases, so generally does energy consumption. Generally, electrical power grids have the capacity to provide electrical energy to its respective consumers or customers. However, at times, a power grid may begin operating beyond its recommended capacity. This scenario will typically arise when electrical supply cannot meet the load demand. For example, during summer months in warm climates, the load demand produced by air-conditioners or the like can cause a grid to operate above its recommended load capacity. This excessive load demand can have detrimental effects on the grid. For example, on a "global" scale in terms of the overall grid, grid failure can occur, and large segments of the population that rely on the grid may go without power for a period of time.

Detrimental effects can also occur on a smaller scale. For example, a transformer that supplies energy to one or more consumers may become overloaded, though the grid of which the transformer is a part of remains healthy. In such a scenario, the overloaded transformer may fail, causing the respective consumers to be without power for a period of time.

It would therefore be desirable to provide an apparatus and method for reducing loads on transformers and/or power grids when desired.

BRIEF DESCRIPTION OF THE INVENTION

In accordance with one aspect of the invention, a system includes a distribution transformer having a communications module. The distribution transformer is configured to convert a first high voltage electricity from a high voltage distribution line to a first low voltage electricity and convey the first low voltage electricity along a low voltage line to an electrical device. The communications module is configured to transmit a load reduction request along the low voltage line to the electrical device.

In accordance with another aspect of the invention, a method of manufacturing an electrical system. The method includes assembling a distribution transformer capable of stepping down high voltage electricity from a high voltage distribution line and conveying stepped down electricity along a low voltage line to power an electrical device, where the high voltage distribution line is configured to transfer a higher voltage electricity than the low voltage line. The method also includes coupling a communications module to the distribution transformer and to the low voltage line, the communications module configured to convey a request along the low voltage line to the electrical device, where the request is a request to reduce a load drawn from the distribution transformer by the electrical device.

In accordance with another aspect of the invention, an apparatus including a distribution transformer and a communications system coupled to the distribution transformer. The distribution transformer is configured to step down electricity received from a high voltage distribution power line and provide the stepped down electricity to an electrical device via a low voltage power line. The communications system is configured to transmit a request along the low voltage line to the electrical device, where the request is a request to reduce a load on the distribution transformer.

Various other features and advantages will be made apparent from the following detailed description and the drawings.

BRIEF DESCRIPTION OF THE DRAWINGS

The drawings illustrate embodiments presently contemplated for carrying out the invention.

In the drawings:

FIG. 1 is a block diagram of an augmented transformer according to an embodiment of the invention.

FIG. 2 is a block diagram of an augmented transformer according to another embodiment of the invention.

FIG. 3 is a block diagram of the communications module of FIG. 2 according to an embodiment of the invention.

FIG. 4 is a block diagram of an intermediary electrical device according to an embodiment of the invention.

FIG. 5 is a flowchart of a technique for engaging in an energy transfer between an augmented transformer and an electric device according to an embodiment of the invention.

DETAILED DESCRIPTION

Electrical generation facilities or systems generally deliver high voltage electricity along distribution lines to residential and/or commercial customers. This high voltage electricity is often on the order of several kilovolts. Generally, at or near the point of consumption, the distribution line's high voltage energy is stepped down to a lower utility voltage energy by a step-down distribution transformer before the energy is conveyed to a consumer via one or more low voltage lines. Often, these distribution transformers are located many feet above ground on power poles, located outdoors in safety-shielded containers on a structural support slab on the ground, located underground, or located inside a building within a safety shielded enclosure.

In general, it is beneficial to minimize any voltage drop between the low voltage side of a distribution transformer and an electrical device receiving power from the distribution transformer. As such, since there is generally a voltage drop per linear distance unit along the low voltage line(s), distribution transformers are typically located as near the point of energy consumption as possible subject to regulation and economic constraints.

Since a distribution transformer is often located as near the point of energy consumption as possible considering the regulation and economic constraints, the location of the distribution transformer also provides a good approximation of an electrical device's location. That is, an electrical device connected to receive power from the distribution transformer is generally located near the distribution transformer.

Accordingly, the location of a distribution transformer can provide an approximate location of a consumer or electric device. Further, a distribution transformer can also serve as a node where consumer load can be managed. Due in part to the location of distribution transformers, the distribution transformer can be considered a point of entry into an electrical power grid. That is, via a distribution transformer, consumers are generally allowed to access the energy of the high voltage distribution lines. As such, since many consumers enter the grid via a distribution transformer, distribution transformers serve as a node where consumer load can be managed.

FIG. 1 is a block diagram of a control or augmented distribution transformer 100 according to an embodiment of the invention. Augmented distribution transformer 100 is coupled to a high voltage distribution line 102 via a first conductor 104 and is also coupled to a neutral line 106 via a second conductor 108. Augmented distribution transformer 100 is configured to step down high voltage electricity from high voltage distribution line 102 to a lower voltage electricity, which is passed along a low voltage line 110 to an electrical device 112 and/or other electrical devices such as a plug-in electric hybrid vehicle (PHEV) PHEV 114. In addition, augmented distribution transformer 100 is configured to step up electricity received from electrical device 112 or PHEV 114 via low voltage line 110 and provide the stepped up electricity to high voltage distribution line 102.

Though one low voltage line 110 is depicted in FIG. 1, it is contemplated that augmented distribution transformer 100 be configured to pass low voltage electricity along more than one low voltage line such as, for example, three low voltage lines (not shown) in a three-phase setting. Likewise, though only one high voltage distribution line 102 is shown, it is contemplated that augmented transformer 100 may be configured to receive high voltage electricity from more than one high voltage distribution line (not shown). For example, augmented distribution transformer 100 may be configured to receive high voltage electricity from three high voltage distribution lines in a three-phase setting.

Augmented distribution transformer 100 includes a communications module 116 that is configured to transmit a load reduction request along low voltage line 110 to electrical device 112 and/or PHEV 114. The load reduction request is a request to reduce a load on augmented distribution transformer 100. In response to the request, electrical device 112 and/or PHEV 114 may reduce its load. Accordingly, wear on augmented distribution transformer 100 as well as the load on the grid (not shown) may be reduced or minimized.

It is contemplated that augmented distribution transformer 100 may also be configured to provide temporal information (e.g., local time) and/or geographic information along low voltage lines 110 to electrical device 112 and/or PHEV 114. It is envisioned that the geographic information includes the geographic location of augmented distribution transformer 100. Since it is likely that augmented distribution transformer 100 is within the proximity of electrical device 112 and PHEV 114, it is also likely that the geographic information serves as an approximation of the location of electrical device 112 and PHEV 114.

It is noted that electrical device 112 and PHEV 114 are merely exemplary electrical devices and that augmented distribution 100 transformer is capable of providing temporal and geographic information to a variety of electrical devices (not shown).

Electrical device 112 and/or PHEV 114 can use the temporal and geographic location for a variety of purposes. According to one example, electrical device 112 may be a clock or include a clock. As such, the temporal information can be used to set the clock to the local time once the clock is energized via low voltage line 110. Alternatively, electrical device 112 could simply be a display that has the ability to display the time information. Such a device need not have time keeping capabilities. As such, the time information would be provided by communication module 116 along low voltage line 110 to electrical device 112, and electrical device 112 would simply present a visual depiction of the time information. In contrast to many common clocks that require time keeping capabilities and related circuitry, electrical device 112 needs only the capability to display the received time information.

Like the clock display discussed above, DVD players, ovens, microwaves, refrigerators, or other devices that often include clocks could instead simply include a display, rather than a "clock" having time keeping capabilities. As such, manufacturing cost of these devices could be reduced.

As with the temporal or time information, it is contemplated that the geographic information could be used for a variety of purposes. For example, PHEV 114 may have the ability to utilize the geographic information. PHEV 114 may store the location information each time PHEV 114 receives a charge from an energy provider or each time PHEV 114 provides energy to an energy provider. The stored geographic information could then later be used to, for example, verify an energy provider credit or debit.

An exemplary scenario will be illustrative of a such a verification technique. For example, an owner of a PHEV (e.g., PHEV 114) that resides in the state of New York may travel to Texas for leisure or work. While in Texas, the owner may plug into an energy provider's grid via low voltage line(s) (e.g., low voltage line 110) and an augmented distribution transformer (e.g., augmented distribution transformer 100) to receive a charge. The PHEV then receives a charge and stores the received temporal and geographic information.

Later, the owner may receive a bill or invoice receipt detailing the cost of energy provided to the PHEV while in Texas. The owner can then access the stored geographic information and verify that indeed he was in Texas during the billing period and that his PHEV did receive a charge while there. Further, the owner can access the temporal information to determine how long the PHEV was in the charge state. By accessing the temporal and geographic information, a consumer or owner could determine whether or not the bill is accurate. Such a bill or invoice receipt could be inaccurate for several reasons. For example, the energy provider may have made a billing error. Alternatively, the identification information of the PHEV could have been "spoofed." That is, identification information of a PHEV could have been hijacked by a criminal and improperly used such that when the criminal charges his vehicle, the energy provider is "spoofed" into believing the PHEV belongs to another.

In yet another example, an energy provider can utilize geographic information to aid in load balancing. For example, several PHEVs in the same geographic region may be coupled to a utility via one or more augmented transformers. In such a scenario, before receiving charge, each PHEV would authenticate itself to the energy provider. In addition, each PHEV may send geographic location information received from the augmented transformers to the energy provider. By knowing the number of PHEVs accepting a charge in a particular region, the energy provider could then assess the load on particular augmented transformers or on regions of the utility grid. If it is determined that a particular augmented transformer has reached capacity or that a portion of the "grid" has reached capacity, the energy provider may postpone the conveyance of energy to one or more PHEVs until the load has decreased.

Embodiments of the invention are not limited to the above-described clocks, clock displays, or PHEVs. That is, according to embodiments of the invention, the augmented transformer (e.g., augmented distribution transformer 100) is capable of conveying load reduction requests, geographic information, and/or time information to any device capable of receiving such information. It is also noted that the augmented transformer is capable of conveying energy to multiple consumers.

Referring now to FIG. 2, a block diagram of an augmented distribution transformer 118 is shown according to another embodiment of the invention. As with augmented distribution transformer 100 of FIG. 1, augmented distribution transformer 118 of FIG. 2 is configured to step down high voltage electricity from a high voltage distribution line 120 and provide a lower voltage electricity along a low voltage line 122 to an electrical device 124. Though high voltage distribution line 120 and low voltage line 122 are each respectively depicted as a single line, it is contemplated that high voltage distribution line 120 may represent multiple lines (e.g., three high voltage lines for three phases) and that low voltage line 122 may represent multiple lines.

It is contemplated that augmented distribution transformer 118 may also be configured to step up low voltage electricity from low voltage line 122 and provide a higher voltage electricity to high voltage distribution line 120.

Augmented distribution transformer 118 includes a communications module or system 126 configured to transmit or convey a load reduction request along low voltage line 122 to electrical device 124. The load reduction request may be sent, for example, when it is determined that grid load or the load on augmented distribution transformer 118 is at or above a predetermined threshold. In response thereto, electrical device 124 may reduce a load drawn thereby on augmented distribution transformer 118, thus minimizing wear on augmented distribution transformer 118. Further, such load reduction may reduce the chance of overload on the electrical grid (not shown) to which augmented distribution transformer 118 is coupled via high voltage distribution line 120.

It is contemplated that augmented distribution transformer 118 may also be configured to relay temporal and geographic information to electrical device 124 via low voltage line 122. Though FIG. 2 only depicts one electrical device 124 coupled to augmented distribution transformer 118 via low voltage line 122, it is contemplated that augmented distribution transformer 118 may be configured to pass the load reduction request and the temporal and geographic information to more than one electrical device coupled thereto via one or more low voltage lines (e.g., low voltage line 120). Further, electrical device 124 may merely be an intermediary between augmented transformer 118 and another electrical device (not shown) coupled to electrical device 124. An example of such an intermediary device will be described in detail below with respect to FIG. 4.

Still referring to FIG. 2, it is contemplated that communications module 126 may include one or more components, systems, or modules to provide various types of functionality thereto. For example, referring also to FIG. 3, according to embodiments of the invention, communications module 126 includes a power line communication (PLC) module 128 configured to relay the load reduction request to electrical device 124. According to another embodiment, communications module 126 may also be configured to relay the local time and geographic information along low voltage line 122 to electrical device 124.

It is contemplated that communications module 126 may also include other components, systems, or modules. For example, communications module 126 may include a load sensing system 130, an antenna 132, an internet server 134, a GPS module 136, an authentication module 138, an encryption module 140, a memory module 142, a radiation detector 144, a diagnostic module 146, a processor 148, a sensor system 149, and/or a battery 150, where modules 130-150 are shown in phantom. Further details regarding the various components (i.e., modules or components 128-150) will be set forth below.

It is contemplated that PLC module 128 may be configured to provide a load reduction request, as well as the temporal and geographic information, along low voltage line 122 to electrical device 124. In addition, it is contemplated that PLC 128 may be configured to maximize the efficiency of sending the load reduction request and the temporal and geographic information along low voltage line 122 while minimizing inductive coupling between high voltage distribution line 120 and low voltage line 122. As such, PLC module 128 may be configured to reduce or eliminate the injection of noise into high voltage distribution line 120 during the conveyance of the temporal information, geographic information, and/or the load reduction request.

According to another embodiment, it is contemplated that PLC module 128 may also be configured to receive information sent along high voltage distribution line 120. For example, PLC module 128 may be configured to receive, via high voltage distribution line 120, a load reduction transmit command that initiates the transmission of the load reduction request to electrical device 124. According to such an embodiment, it is envisioned that the transmit command could be sent from a location remote from augmented distribution transformer 118 when it is remotely determined that the load level(s) of augmented distribution transformer 118 reach or exceed a predetermined threshold level. In other words, a control mechanism (not shown) of the grid could determine that the load level(s) of augmented distribution transformer 118 should be reduced in order to protect the functionality of augmented distribution transformer 118 and/or the grid itself. In such a scenario, the controlling mechanism may relay a load reduction transmit command to augmented distribution transformer 118. In response thereto, augmented distribution transformer 118 may be configured to transmit or relay a load reduction request, via PLC module 128, along low voltage line 122 to electrical device 124.

In an alternate embodiment, rather than remotely determining load level(s), it is contemplated that augmented distribution transformer 118 locally determine load level(s). For example, load sensing system 130 may include one or more sensors (not shown) to determine load level(s) of the load drawn on augmented distribution transformer 118. A processor (not shown) thereof may then determine if the load level(s) or values meet or exceed one or more predetermined threshold value(s). Alternatively, processor 148 could make such a determination. In either case, if the predetermined threshold value(s) are met or exceed, the processor may cause communications module 126 to transmit the load reduction request along low voltage line 122 to electrical device 124.

Referring back to PLC module 128, it is contemplated that PLC module 128 may also be configured to receive other information, such as the local time and geographic information, from an energy provider or another party via high voltage distribution line 120. Further, PLC module 128 may be configured to provide information or data along high voltage distribution line 120 to an energy provider or another party (not shown).

Alternatively, or in addition thereto, it is contemplated that communications module or system 126 may include antenna 132 configured to wirelessly receive load reduction transmit commands generated remotely. Further, antenna 132 may be configured to wirelessly receive the temporal and/or geographic location information that may be provided to electrical device 124 via low voltage line 122.

Upon receiving the load reduction transmit command, the temporal information, and/or geographic information via antenna 132, communications module 126 may provide such information to electrical device 124 via low voltage line 122.

As explained above, it is contemplated that communications module 126 may include internet server 134. It is contemplated that internet server 134 may be configured to provide a data transport access for augmented distribution transformer 118 using the Internet. Accordingly, augmented distribution transformer 118 may employ internet server 134 for messaging across the Internet. Such messaging could include the power line transport of data to an energy provider or another party (e.g., a consumer).

In order to determine the geographic information, it is contemplated that communications module 126 includes global positioning system (GPS) module 136 configured to determine the geographic location of augmented distribution transformer 118. According to such an embodiment, GPS module 136 calculates the geographic information, and communications module 126 then sends the geographic location information along low voltage line 122 to electrical device 124. GPS module 136 may have the ability to calculate a global position from satellite signals or information relating thereto.

If position errors are present in the geographic information, it is contemplated that GPS module 136 may also be configured to correct for such errors. For example, GPS module 136 may have differential global positioning system (DGPS) capabilities. In such an embodiment, GPS module 136 may utilize a priori information pertaining to the location of augmented distribution transformer 118 to determine a position correction. That is, GPS module 136 may have its location pre-programmed therein. This pre-programmed information (i.e., a verified location) may then be compared with its global position as calculated from satellite signals to determine a difference therebetween. A position correction may then be determined from the comparison. It is contemplated that augmented distribution transformer 118 may be configured to wirelessly broadcast the position correction information via antenna 132 to other devices (not shown). Accordingly, other devices (not shown) having GPS capabilities and within the proximity of augmented distribution transformer 118 may utilize the position correction information to correct for satellite signal errors.

It is contemplated that, rather than employing GPS module 136 to determine the geographic location of augmented distribution transformer 118, communications module 126 may employ a LORAN or other type of device (not shown) to determine the geographic location of augmented distribution transformer 118.

As set forth above, communications module 126 of augmented distribution transformer 118 may also include authentication module 138. According to an embodiment of the invention, authentication module 138 is configured to authenticate communications sent between communications module 126 and electrical device 124. For example, authentication module 138 may be configured to require that electrical device 124 be identified prior to any exchange of energy. In such a scenario, electrical device 124 may authenticate itself to authentication module 138 and authentication module 138 could determine, via the authentication, whether or not electrical device 124 has permission to receive energy from augmented distribution transformer 118 and/or whether electrical device 124 has permission to provide energy to high voltage distribution line 120 via augmented distribution transformer 118. Augmented distribution transformer 118 may also, via authentication module 138, have the ability to determine what type of device electrical device 124 is via the authentication sent along low voltage line 122. For example, authentication module 138 may determine that electrical device 124 is a dishwasher, PHEV, or a heating and cooling system.

Referring now to encryption module 140, in order to protect information or data sent between augmented transformer 118 and electrical device 124 or between augmented distribution transformer 118 and high voltage distribution line 120, encryption module 140 may be configured to ensure that such information or data is encrypted to address privacy issues. It is contemplated that encryption module 140 may also be configured to decrypt data received via low voltage line 122 or high voltage distribution line 120.

In addition to being configured to relay load reduction requests, temporal information, and/or geographic information to electrical device 124 via low voltage line 110, it is contemplated that communications module 126 may also be configured to relay other types of information.

For example, communications module 126 may be configured to relay contractual information pertaining to the sale or purchase of energy. For example, electrical device 124 may be a PHEV, and communications module 126 may be configured to relay contractual information to PHEV along low voltage line 122 so that PHEV can determine whether or not to enter into a contractual relationship with an energy provider to purchase energy (i.e., receive a charge) therefrom or to sell energy thereto. A technique exemplifying the relay of such contractual information will be described below in detail with respect to FIG. 5.

Still referring to FIGS. 2 and 3, it is contemplated that communications module 126 also includes memory module 142, where memory module 142 is configured to store information. Memory module 142 may include one or more tangible data storage devices such as a magnetic drive, optical drive, integrated circuits, or other type of tangible computer readable storage media. The information stored in memory module 142 may include information representing, for example, the time at which electrical device 124 consumed electricity, a quantity of energy consumed by the electric device 124, the cost of the energy consumed from electrical device 124, the quantity of energy received by electrical device 124, information pertaining to the health of augmented distribution transformer 118, times when a load reduction request was transmitted, and/or an identification of electric device 124.

According to embodiments of the invention, augmented distribution transformer 118 also includes radiation detector 144. In such an embodiment, radiation detector 144 is configured to detect radiation and, if radiation is detected, relay notification of the detected radiation to a third party such as a national security agency. It is contemplated that either radiation detector 144 has the ability to relay such information or that communications module 126 relay such information. According to one embodiment, radiation detector 144 may be positioned at least partially within augmented distribution transformer 118, and according to another embodiment, it may be located externally on augmented distribution transformer 118. In either embodiment, augmented distribution transformer 118 would be configured in such a manner that would allow radiation to pass to radiation detector 144. For example, if radiation detector 144 were located within augmented transformer 118, augmented transformer 118 may include a "window" (not shown) that effectively allows radiation to pass to radiation detector 144.

As set forth above, it is contemplated that augmented distribution transformer 118 may include one or more of a variety of components (e.g., communications module 126, PLC module 128, load sensing system 130, antenna 132, internet server 134, GPS module 136, authentication module 138, encryption module 140, memory module 142, and radiation detector 144). To monitor the health of one or more of these components or modules, it is contemplated that augmented distribution transformer 118 may include diagnostic module 146. According to such an embodiment, diagnostic module 146 would be configured to monitor one or more of the components to determine a health status of those components monitored. The health status could then be relayed to a party of interest via, for example, PLC module 128 along high voltage distribution line 120 or by another means (e.g., wirelessly via antenna 132). Alternatively, or in addition thereto, diagnostic module 146 could store the health status information in a memory module such as memory module 142 for later retrieval and/or for back-up.

In addition to having the ability to monitor one or more of components 126-144, it is envisioned that diagnostic monitor 146 may also have the ability to assess the health status of other components or parts (not shown) of augmented transformer 118. For example, diagnostic module 146 may have the ability to monitor the windings (not shown) of augmented transformer 118 to assess the wear or load thereon. Additionally, or alternatively thereto, it is contemplated that diagnostic health module 146 may determine voltage, current, and/or power levels of augmented distribution transformer 118. Diagnostic module 146 may then determine if the voltage, current, and/or power levels exceed threshold level(s). If so, communication module 126 may send control information to the power distribution system or energy provider indicating that augmented distribution transformer 118 is operating at level(s) above threshold level(s). Such control information may be used, for example, to determine whether or not augmented distribution transformer 118 should be replaced with another augmented distribution transformer (not shown) having a greater operating capacity. Further, such information may cause a remote device to convey a load reduction transmit command to augmented distribution transformer 118, thus causing communications module 126 to transmit a load reduction request to electrical device 124. Accordingly, diagnostic module 146 may serve as an alternative to load sensing system 130.

It is envisioned that diagnostic module 146 may also have the ability to determine the health status of augmented distribution transformer 118 via analysis of data received from sensor system 118. It is contemplated that sensor system 149 may be configured to provide transformer temperature data, barometric pressure data, transformer pressure data, and/or other diagnostic data to diagnostic module 146 for diagnostic health analysis.

For example, to determine the temperature of augmented distribution transformer 118, it is contemplated that sensor system 149 includes a temperature sensor (not shown). Augmented distribution transformer 118 may then send the temperature information or data to diagnostic module 146, which could compare the temperature to a threshold value to determine an operating characteristic of augmented distribution transformer 118.

Alternatively, such temperature information could, for example, be sent along high voltage distribution line 120 via PLC module 128 to an energy provider or another party of interest. With such information, the energy provider could determine a health status of augmented distribution transformer 118.

Additionally, an energy provider could use the temperature information to determine if more electrical devices (e.g., electrical device 124 and/or PHEV 114 of FIG. 1) can be charged. For example, a lower temperature may allow more PHEVs to be charged.

To power one or more of components 126-149, it is contemplated that augmented distribution transformer 118 may include battery 150, a rechargeable battery, and/or other capacitive device. Alternatively, or in addition thereto, one or more components 126-146 of augmented distribution transformer 118 may be powered by augmented distribution transformer 118 via electricity from high voltage distribution line 120. This electricity could either be in the high voltage form (prior to step down) or in a low voltage form (after step down). It is noted that it is contemplated that diagnostic module 146 could also be configured to assess the health or charge of battery 150 or the like. In such an embodiment, augmented distribution transformer 118 could either store the health status of battery 150 in memory module 142 and/or provide such health status information to a party of interest.

As discussed above, it is contemplated that communications module 126 may include a computer or processor 148. According to an embodiment of the invention, processor 148 aids in the control of components 128-146, 149-150. However, it is envisioned that, in addition to or alternatively, one or more components 128-146, 149-150 may include a processor (not shown) for control.

FIG. 4 is block diagram of an exemplary intermediary device 152 according to an embodiment of the invention. As explained above with respect to FIG. 2, it is contemplated that the electrical device (e.g., electrical device 124) coupled to the low voltage line(s) (e.g., low voltage line 122) may an intermediary device. Intermediary device 152 of FIG. 4 depicts an example of such a device.

According to an embodiment of the invention, intermediary device 152 is coupled to a low voltage line 154, which is coupled to an augmented distribution transformer 156. Augmented distribution transformer 156 is configured to provide at least a load reduction request to intermediary device 152 from augmented distribution transformer 156 via low voltage line 154. Further, augmented distribution transformer 156 is configured to provide power to a plurality of electrical devices 158-164 via low voltage line 154 and intermediary device 152.

According to an embodiment of the invention, intermediary device 152 includes a plurality of circuits 166-172, where each circuit 166-172 is configured to convey power to at least one electrical device 158-164, respectively. It is envisioned that intermediary device 152 may include more or less circuitry than that shown (166-172) to convey power to more or less electrical devices than those shown (158-164).

Intermediary device 152 includes a processor 174 configured to control power conveyance though each circuit 166-172. For example, augmented distribution transformer 156 may transmit a load reduction request to intermediary device 152 via low voltage line 154. Processor 174 may then determine which, if any, electrical device 158-164 will have its load reduced.

In other words, intermediary device 152 serves as a load balancing system. The following exemplary scenario will illustrate the load balancing functionality of intermediary device 152 according to one embodiment. According to one scenario, electrical device 158 may be a clothes dryer, electrical device 160 may be a water heater, electrical device 162 may be a furnace motor, and electrical device 164 may be a PHEV. Upon receiving a load reduction request from augmented distribution transformer 156, processor 174 may determine that the furnace motor 162 cannot or should not have its load reduced. Further, processor 174 may determine that at least one of the clothes dryer 158, the water heater 160, and the PHEV 164 may have its load reduced. As such, processor 174 may cause at least one of circuits 166, 168, 172 to reduce the power provided to its respective electrical device 158, 160, 164. As such, the load drawn on augmented distribution transformer 156 will be reduced.

FIG. 5 is a flowchart of a technique 176 for obtaining contractual records pertaining to energy conveyance according to an embodiment of the invention. At block 178, an augmented transformer relays energy transfer contract terms to a PHEV via a low voltage line. It is contemplated that energy transfer contract terms include, for example, a credit per kilowatt-hour value, a debit per kilowatt-hour value, and/or time or date dependent rates. It is also contemplated that the energy transfer contract terms include an identification unique to the PHEV. At block 180, the PHEV receives the energy transfer contract terms from the augmented transformer via the low voltage line.

At block 182, the PHEV determines whether to accept or decline the energy transfer contract terms. If the PHEV decides to decline the energy transfer contract terms 184, process control proceeds back to block 178.

On the other hand, if the PHEV accepts the energy transfer contract terms 186, the PHEV sends an energy transfer request to the augmented transformer at block 188. At block 190, the augmented transformer saves the contract terms in a computer readable storage medium (e.g., memory module 142 of FIG. 3) and/or conveys the contract terms to a third party. At block 192 of FIG. 5, the augmented transformer initiates and monitors the energy transfer. It is noted that the energy transfer may pertain to the PHEV either receiving energy via the augmented transformer (i.e., receive a charge) or to the PHEV providing energy to a high voltage line via augmented transformer. In either scenario, as the augmented transformer monitors the energy transfer, it is contemplated that as the augmented transformer monitors the energy transfer, the augmented transformer save a record of the energy transfer to a computer readable storage medium and/or transfer that information to a third party.

Since the contract terms may include an identification unique to the PHEV, the contract terms along with the record of the energy transfer may be used to bill the owner or user for energy consumed. Alternatively, if the PHEV provides electricity rather than receives electricity, the contract terms along with the record of energy transfer may be used by a third party to provide a credit to the owner or user of the PHEV.

Though technique 176 has been described in terms of a PHEV and an augmented transformer, it is contemplated that technique 176 be equally applicable in a scenario where another type of electric device, other than a PHEV, is employed. For example, rather than a PHEV, a home or residence could be may be outfitted or retrofitted with an electrical device that negotiates energy conveyance terms with the augmented transformer. In such an embodiment, the contract terms and record of energy conveyance could be used to "bill" the home owner or resident or to provide the home owner or resident a credit.

Therefore, according to one embodiment of the invention, a system includes a distribution transformer having a communications module. The distribution transformer is configured to convert a first high voltage electricity from a high voltage distribution line to a first low voltage electricity and convey the first low voltage electricity along a low voltage line to an electrical device. The communications module is configured to transmit a load reduction request along the low voltage line to the electrical device.

According to another embodiment of the invention, a method of manufacturing an electrical system. The method includes assembling a distribution transformer capable of stepping down high voltage electricity from a high voltage distribution line and conveying stepped down electricity along a low voltage line to power an electrical device, where the high voltage distribution line is configured to transfer a higher voltage electricity than the low voltage line. The method also includes coupling a communications module to the distribution transformer and to the low voltage line, the communications module configured to convey a request along the low voltage line to the electrical device, where the request is a request to reduce a load drawn from the distribution transformer by the electrical device.

According to another embodiment of the invention, an apparatus including a distribution transformer and a communications system coupled to the distribution transformer. The distribution transformer is configured to step down electricity received from a high voltage distribution power line and provide the stepped down electricity to an electrical device via a low voltage power line. The communications system is configured to transmit a request along the low voltage line to the electrical device, where the request is a request to reduce a load on the distribution transformer.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   a distribution transformer comprising a communications module, the distribution transformer configured to:
   convert a first high voltage electricity from a high voltage distribution line to a first low voltage electricity;
   convey the first low voltage electricity along a low voltage line to an electrical device;
   receive a second low voltage electricity from the low voltage line, wherein the second low voltage electricity is provided by the electrical device;
   convert the second low voltage electricity to a second high voltage electricity; and
   convey the second high voltage electricity to the high voltage distribution line;
   wherein the communications module is configured to transmit a load reduction request along the low voltage line to the electrical device
   wherein the communications module is further configured to transmit time of day information and geographic information along the low voltage line to the electrical device, and wherein the geographic information includes a geographic location of the distribution transformer;
   wherein the distribution transformer further comprises a global positioning module configured to calculate the geographic location of the distribution transformer;
   wherein the global positioning module is further configured to determine a difference between the calculated geographic location and a verified geographic location of the distribution transformer; and
   wherein the distribution transformer is further configured to wirelessly broadcast a geographic correction based on the difference.

2. The system of claim 1 further comprising the electrical device, wherein the electrical device is a load balancing module configured to:
   convey electrical power from the distribution transformer to a plurality of additional electrical devices;
   independently control power conveyed to each of the plurality of electrical devices;

receive the load reduction request transmitted along the low voltage line; and reduce power to at least one of the plurality of electrical devices in response to reception of the load reduction request.

3. The system of claim 1 wherein the distribution transformer further comprises a radiation sensor configured to detect nuclear radiation.

4. The system of claim 1 further comprising a power line communication (PLC) module configured to receive a transmit command transmitted along the high voltage distribution line, wherein the transmission of the load reduction request along the low voltage line is carried out by the PLC module in response to reception of the transmit command.

5. The system of claim 1 further comprising a load sensing module configured to:

determine a load on the distribution transformer; and
compare a value of the load to a threshold value.

6. The system of claim 5 wherein the transmission of the load reduction request is based on the comparison of the value of the load to the threshold value.

7. A method of manufacturing an electrical system comprising:

assembling a distribution transformer capable of stepping down high voltage electricity from a high voltage distribution line and conveying stepped down electricity along a low voltage line to power an electrical device, wherein the distribution transformer comprises a global positioning module, and wherein the high voltage distribution line is configured to transfer a higher voltage electricity than the low voltage line; and coupling a communications module to the distribution transformer and to the low voltage line, and configuring the communications module to:

convey a request along the low voltage line to the electrical device, wherein the request is a request to reduce a load drawn from the distribution transformer by the electrical device;

receive low voltage electricity from the electrical device on the low voltage line;

convert the low voltage electricity to a high voltage electricity;

convey the high voltage electricity to the high voltage distribution line; and transmit time of day information and geographic information along the low voltage line to the electrical device, wherein the geographic information includes a geographic location of the distribution transformer;

configuring the global positioning module to calculate the geographic location of the distribution transformer and to determine a difference between the calculated geographic location and a verified geographic location of the distribution transformer; and configuring the distribution transformer to wirelessly broadcast a geographic correction based on the difference.

8. The method of claim 7 further comprising assembling the electrical device comprising a load balancing module capable of reducing a load drawn on the distribution transformer.

9. The method of claim 7 further comprising assembling the electrical device comprising a load balancing module configured to:

receive the request;
independently control power conveyed to a plurality of additional electrical devices and supplied via the distribution transformer; and reduce power conveyed to at least one electrical device of the plurality of electrical devices based on the request.

10. The method of claim 7 wherein assembling the communications module further comprises assembling the communications module configured to convey local time information and geographic location information along the low voltage line to the electrical device, wherein the geographic information comprises a geographic location of the distribution transformer.

11. The method of claim 7 wherein assembling the communications module comprises assembling a power line communications (PLC) module configured to convey the request along the low voltage line to the electrical device.

12. The method of claim 11 wherein assembling the PLC module further comprises assembling the PLC module configured to send information received from the electrical device to a party of interest via the high voltage distribution line.

13. An apparatus comprising:

a distribution transformer configured to:

step down electricity received from a high voltage distribution power line;

provide the stepped down electricity to an electrical device via a low voltage power line;

step up electricity received from the electrical device via the low voltage power line; and provide the stepped up electricity to the high voltage power line;

a communications system coupled to the distribution transformer and configured to transmit a request along the low voltage line to the electrical device, wherein the request is a request to reduce a load on the distribution transformer;

wherein the communications module is further configured to transmit time of day information and geographic information along the low voltage line to the electrical device, wherein the geographic information includes a geographic location of the distribution transformer;

wherein the distribution transformer further comprises a global positioning module configured to calculate the geographic location of the distribution transformer;

wherein the global positioning module is further configured to determine a difference between the calculated geographic location and a verified geographic location of the distribution transformer; and wherein the distribution transformer is further configured to wirelessly broadcast a geographic correction based on the difference.

14. The apparatus of claim 13 wherein the distribution transformer comprises a processor configured to:

determine if a load on the distribution transformer is greater than or equal to a threshold level; and initiate the transmsission of the request if the load on the distribution transformer is greater than or equal to the threshold level.

15. The apparatus of claim 13 wherein the communications system is further configured to receive a transmit command from a remote source, wherein the transmission of the request is based on reception of the transmit command.

16. The apparatus of claim 15 wherein the communications system is configured as one of a wired communications system configured to receive the transmit command via the high voltage distribution line and a wireless communications system configured to receive the transmit command wirelessly.

17. The apparatus of claim 13 wherein the communications system is configured to transmit temperature data along the high voltage distribution power line to a party of interest, and wherein the temperature data is representative of the temperature of the distribution transformer.

18. A system comprising:
a distribution transformer comprising a communications module, the distribution transformer configured to:
convert a first high voltage electricity from a high voltage distribution line to a first low voltage electricity;
convey the first low voltage electricity along a low voltage line to an electrical device;
transmit time of day information and geographic information along the low voltage line to the electrical device;
wherein the communications module is configured to transmit a load reduction request along the low voltage line to the electrical device;
wherein the geographic information includes a geographic location of the distribution transformer;
wherein the distribution transformer further comprises a global positioning module configured to:
calculate the geographic location of the distribution transformer; and
determine a difference between the calculated geographic location and a verified geographic location of the distribution transformer; and
wherein the distribution transformer is further configured to wirelessly broadcast a geographic correction based on the difference.

19. The system of claim 18 further comprising the electrical device, wherein the electrical device is a load balancing module configured to:
convey electrical power from the distribution transformer to a plurality of additional electrical devices;
independently control power conveyed to each of the plurality of electrical devices;
receive the load reduction request transmitted along the low voltage line; and
reduce power to at least one of the plurality of electrical devices in response to reception of the load reduction request.

20. The system of claim 18 further comprising a power line communication (PLC) module configured to receive a transmit command transmitted along the high voltage distribution line, wherein the transmission of the load reduction request along the low voltage line is carried out by the PLC module in response to reception of the transmit command.

21. The system of claim 18 further comprising a load sensing module configured to:
determine a load on the distribution transformer; and
compare a value of the load to a threshold value.

22. The system of claim 21 wherein the transmission of the load reduction request is based on the comparison of the value of the load to the threshold value.

* * * * *